(12) United States Patent
Zhang et al.

(10) Patent No.: US 11,262,698 B2
(45) Date of Patent: Mar. 1, 2022

(54) PREPARATION SYSTEM AND METHOD FOR POLYMER-DISPERSED LIQUID CRYSTAL HOLOGRAPHIC GRATING

(71) Applicant: JOURNEY TECHNOLOGY, LTD., Beijing (CN)

(72) Inventors: Menghua Zhang, Shanghai (CN); Yu Zheng, Beijing (CN); Xinyan Han, Beijing (CN)

(73) Assignee: JOURNEY TECHNOLOGY, LTD., Beijing (CN)

( * ) Notice: Subject to any disclaimer, the term of this patent is extended or adjusted under 35 U.S.C. 154(b) by 106 days.

(21) Appl. No.: 16/317,674

(22) Filed: Jan. 14, 2019

(65) Prior Publication Data
US 2019/0204780 A1 Jul. 4, 2019

Related U.S. Application Data

(63) Continuation of application No. PCT/CN2016/105039, filed on Nov. 8, 2016.

(30) Foreign Application Priority Data

Jul. 18, 2016 (CN) .......................... 201610564672.4

(51) Int. Cl.
*G02F 1/1337* (2006.01)
*G03H 1/04* (2006.01)
(Continued)

(52) U.S. Cl.
CPC .............. *G03H 1/0402* (2013.01); *G02B 5/32* (2013.01); *G02F 1/1334* (2013.01);
(Continued)

(58) Field of Classification Search
CPC .............. G03H 1/0402; G03H 1/0465; G03H 2001/0439; G03H 2240/53;
(Continued)

(56) References Cited

U.S. PATENT DOCUMENTS 3,746,429 A * 7/1973 Spindel .................. G02B 5/205
359/888
5,900,983 A * 5/1999 Ford ...................... G02B 6/266
359/627

(Continued)

FOREIGN PATENT DOCUMENTS

| CN | 1492259 A | 4/2004 |
| CN | 101793987 A | 8/2010 |
| CN | 102279557 A | 12/2011 |
| CN | 103193999 A | 7/2013 |

OTHER PUBLICATIONS

The World Intellectual Property Organization (WIPO) International Search Report for PCT/CN2016/105039 dated Apr. 20, 2017 4 Pages.

*Primary Examiner* — Audrey Y Chang
(74) *Attorney, Agent, or Firm* — Westbridge IP LLC (57) ABSTRACT

A system includes a laser emitting a laser beam, a beam expander expanding the laser beam, a beam splitter prism splitting the expanded laser beam into first and second split light beams, a liquid crystal box containing polymer-dispersed liquid crystal, first and second reflectors reflecting the first and second split light beams to the liquid crystal box, respectively, and an attenuator arranged on an optical path between the beam expander and the liquid crystal box. The attenuator gradually attenuates at least one of the laser beam, the expanded laser beam, the first split light beam, or the second split light beam along a first set curve. The first split light beam and the second split light beam form interference fringes at the liquid crystal box to expose the polymer-dispersed liquid crystal to form a polymer-dispersed liquid crystal holographic grating having a diffraction efficiency decreasing along a second set curve.

9 Claims, 6 Drawing Sheets

(51) Int. Cl.
　　　*G02F 1/1334*　　　(2006.01)
　　　*G02B 5/32*　　　(2006.01)
(52) U.S. Cl.
　　　CPC . *G03H 2001/0439* (2013.01); *G03H 2223/18* (2013.01); *G03H 2223/24* (2013.01); *G03H 2240/53* (2013.01); *G03H 2260/30* (2013.01)
(58) Field of Classification Search
　　　CPC .......... G03H 2223/24; G03H 2260/30; G03H 2223/18; G03H 2222/35; G03H 2001/0413; G03H 2223/12; G03H 2260/33; F02F 1/1334; F02F 1/13342; G02F 2201/30
　　　USPC .............. 359/3, 35, 888, 7; 356/521; 349/86
　　　See application file for complete search history.

(56) References Cited

U.S. PATENT DOCUMENTS

| | | | | |
|---|---|---|---|---|
| 5,942,157 | A * | 8/1999 | Sutherland | C09K 19/544 252/582 |
| 6,278,506 | B1 * | 8/2001 | Sumiyoshi | G02F 1/13342 349/86 |
| 2003/0073007 | A1 * | 4/2003 | Lahrichi | G11C 13/0033 430/1 |
| 2004/0105048 | A1 * | 6/2004 | Kyu | G02F 1/1334 349/95 |
| 2006/0073393 | A1 | 4/2006 | Sharma et al. | |
| 2008/0117436 | A1 * | 5/2008 | Altenberger | G01B 9/0209 356/521 |

\* cited by examiner

PREPARATION SYSTEM AND METHOD FOR POLYMER-DISPERSED LIQUID CRYSTAL HOLOGRAPHIC GRATING

CROSS-REFERENCE TO RELATED APPLICATIONS

This application is a continuation of International Application No. PCT/CN2016/105039, filed on Nov. 8, 2016, which claims priority to Chinese Application No. 201610564672.4, filed on Jul. 18, 2016, the entire contents of both of which are incorporated herein by reference.

FIELD OF THE DISCLOSURE

The disclosure relates to a technical field of grating preparation, in particular to a preparation system and method for polymer-dispersed liquid crystal holographic grating.

BACKGROUND

Waveguide hologram has been proposed as one of the important technologies for realizing augmented reality. In a waveguide, there are usually two gratings, one of which is used to couple the light from the image source into the waveguide, and after total reflection in the waveguide, it reaches the output of another grating. The imaging beam is sequentially diffracted by the holographic grating during the conductive process, which results in sequentially weakened light intensity incident on the grating. Currently the polymer-dispersed liquid crystal gratings, in which the diffraction efficiency increases in the same direction, are usually realized by controlling the variation in thickness of the grating along the propagation direction of the waveguide.

SUMMARY

The disclosure provides a preparation system and method for a polymer-dispersed liquid crystal holographic grating, so as to conveniently prepare a polymer-dispersed liquid crystal holographic grating with gradually varying diffraction efficiency.

The disclosure provides a system for preparing a polymer-dispersed liquid crystal holographic grating, which is characterized in that comprising: a laser for emitting a laser beam; a beam expander for expanding the laser beam; a beam splitter prism for splitting the expanded laser beam into a first split light beam and a second split light beam; a first reflector for reflecting the first split light beam to the liquid crystal box; a second reflector for reflecting the second split light beam to the liquid crystal box; the liquid crystal box receives the first split light beam and the second split light beam, and the first split light beam and the second split light beam form interference fringes to expose the polymer-dispersed liquid crystal in the liquid crystal box to form a polymer-dispersed liquid crystal holographic grating; at least one attenuator is arranged on an optical path between the beam expander and the liquid crystal box for gradually attenuating the laser light passing through the attenuator along the first set curve to make the diffraction efficiency of the polymer-dispersed liquid crystal holographic grating to decrease along the second set curve.

In an embodiment, the system includes two attenuators; wherein one of the attenuators is arranged on the optical path between the first reflector and the liquid crystal box for attenuating the first split light beam, and the other attenuator is arranged on the optical path between the second reflector and the liquid crystal box for attenuating the second split light beam.

In an embodiment, the system includes two attenuators; wherein one of the attenuators is arranged on the optical path between the beam splitter prism and the first reflector for attenuating the first split light beam, and the other attenuator is arranged on an optical path between the beam splitter prism and the second reflector for attenuating the second split light beam.

In an embodiment, the system includes one of the attenuators arranged on the optical path between the beam expander and the beam splitter prism for attenuating the expanded laser beam; the system further includes a third reflector arranged between the beam splitter prism and the second reflector for reflecting the second split light beam emitted from the beam splitter prism to the second reflector; the first split light beam and the second split light beam have the same optical path from the beam splitter prism to the liquid crystal box.

In an embodiment, the polymer-dispersed liquid crystal includes: photoinitiators, co-initiators, crosslinking agent, surface-active agent, polymers, and nematic liquid crystals mixed in mass percentages of 1%:0.5%:11%:6%:45%:36.5%, respectively.

In an embodiment, the system further includes at least one stepping motor for moving the attenuator into or out of the optical path between the beam expander and the liquid crystal box.

In an embodiment, the transparency of the attenuator gradually decreases along the first set curve.

In an embodiment, the attenuator is a transparent substrate on whose surface a metal coating film with a thickness gradually increasing along the first set curve is deposited.

The disclosure also provides a method for preparing a polymer-dispersed liquid crystal holographic grating, which is characterized in that comprising: a laser for emitting a laser beam; a beam expander for expanding the laser beam; a beam splitter prism for splitting the expanded laser beam into a first split light beam and a second split light beam; a first reflector and a second reflector for reflecting the first split light beam and the second split light beam to the liquid crystal box, respectively; at least one attenuator for gradually attenuating the laser light passing through the attenuator along the first set curve, the attenuator is arranged on an optical path between the beam expander and the liquid crystal box; the liquid crystal box receives the first split light beam and the second split light beam, and the first split light beam and the second split light beam interfere with each other to form interference fringes with the light intensity gradually decreasing along the second set curve, in order to expose the polymer-dispersed liquid crystal in the liquid crystal box, to form a polymer-dispersed liquid crystal holographic grating with the diffraction efficiency gradually decreasing along the second set curve.

The embodiments of the present disclosure provides a system and a method for preparing the polymer-dispersed liquid crystal holographic grating which controls the separation degree of the polymer and the liquid crystal by controlling the light intensity of the exposure light beam by the attenuator, and can prepare a polymer-dispersed liquid crystal holographic gratings whose diffraction efficiency can be increased along the waveguide propagation direction. The present disclosure does not need to change the shape of the liquid crystal box, and the attenuator is easy to prepare, so the large-scale preparation of polymer-dispersed liquid crystal holographic gratings whose diffraction efficiency gradually changes according to a set curve can be realized. In the present disclosure, the change of the diffraction efficiency of the grating can be controlled by adjusting the light intensity of the exposure light, instead of controlling the change of the diffraction efficiency of the grating by adjusting the exposure time, so the problem of complicated control and increased grating preparation period can be avoided.

BRIEF DESCRIPTION OF THE DRAWINGS

In order to more clearly explain the embodiments of the present disclosure, the drawings used in the description of the embodiments will be briefly described below. Obviously, the drawings in the following description are merely some embodiments of the present disclosure, for those skilled in the art, other drawings may also be obtained based on these drawings without any creative work. In the figures.

DETAILED DESCRIPTION OF EMBODIMENTS

To make the objectives, technical solutions, and advantages of the embodiments of the present disclosure clearer, the embodiments of the present disclosure will be described in detail with reference to the accompanying drawings. Herein, the exemplary embodiments of the present disclosure and the description thereof are used to explain the present disclosure, but are not intended to limit the present disclosure.

In order to solve the problem of difficulty in the preparation of the conventional polymer-dispersed liquid crystal grating with increasing diffraction-efficiency and difficulty in large-scale preparation, the inventors considered preparing the polymer-dispersed liquid crystal grating with increasing diffraction efficiency in the same direction without changing the shape of the liquid crystal box. The inventors considered changing the exposure optical path instead of changing the shape of the liquid crystal box to realize a polymer-dispersed liquid crystal grating with an increasing diffractive efficiency. The inventors have further considered increasing the diffraction efficiency of the polymer-dispersed liquid crystal grating in the same direction by changing the exposure time, exposure light intensity, and the like of the polymer-dispersed liquid crystal grating. The inventors further considered that the exposure time along the waveguide propagation direction is difficult to control which usually needs that the shutter be divided very small in this direction, the control is complicated, and the period for making a grating is also very long, thus the inventors considered increasing the intensity of the exposure light to achieve a polymer-dispersed liquid crystal grating with increasing diffraction efficiency. Based on the inventor's series of creative work, the present disclosure proposes a system for preparing a polymer-dispersed liquid crystal holographic grating. The diffraction efficiency of the grating can be gradually increased along the propagation direction of the waveguide light by adding an attenuator to the exposure optical path, the intensity distribution of the light spots of the exposure liquid crystal box, i.e., the interference fringes, can be adjusted and controlled.

A system for preparing a polymer-dispersed liquid crystal holographic grating according to the embodiment of the present disclosure may include a laser, a beam expander, a beam splitter prism, a first reflector, a second reflector, at least one attenuator, and a liquid crystal box.

Wherein the laser is used to emit a laser beam; the beam expander is used to expand the laser beam; the beam splitter prism is used to divide the expanded laser beam into a first split light beam and a second split light beam; the first reflector is used to reflect the first split light beam to a liquid crystal box; a second reflector is used to reflect the second split light beam to the liquid crystal box; and the liquid crystal box receives the first split light beam and the second light beam. The first split light beam and the second light beam forms interference fringes, exposing the polymer-dispersed liquid crystal in the liquid crystal box to form a polymer-dispersed liquid crystal holographic grating; and at least one attenuator arranged on an optical path between the beam expander and the liquid crystal box is used to gradually attenuate the laser light passing through the attenuator along a first set curve, so that the diffraction efficiency of the polymer-dispersed liquid crystal holographic grating can be reduced along the second set curve.

After the laser passing through the attenuator, the laser intensity can be modulated and the laser beam gradually changes along the above-mentioned first set curve. The attenuator can be arranged at a plurality of different positions on the optical path between the beam expander and the liquid crystal box as long as the same light intensity distribution can be obtained after the two laser beams of the first split light beam and the second split light beam are collected in the liquid crystal box, and the interference fringes whose light intensity gradually changes in the same direction can be generated at the liquid crystal box depending on the needs. For example, the attenuator can be arranged on the optical path between the beam expander and the beam splitter prism, or the attenuator can be arranged on the beam path from the beam splitter prism to the reflector (a first reflector and a second reflector), or the attenuator can be arranged on the optical path from the reflector (the first reflector and the second reflector) to the liquid crystal box.

In the preparation system of the polymer-dispersed liquid crystal holographic grating according to the embodiment of the present disclosure, the light intensity of the laser beam on the optical path is modulated by the attenuator in the same direction, and the light intensity of interference fringes at the liquid crystal box can be gradually changed in the same direction, thereby after the polymer-dispersed liquid crystal in the liquid crystal box is exposed by interference fringes, the separation degree of the polymer and the liquid crystal gradually changes in the same direction, so that a polymer-dispersed liquid crystal holographic grating with a diffraction efficiency increasing or decreasing in the same direction can be prepared. The preparation system of the present embodiment does not need to change the shape structure of the liquid crystal box, but only need to modulate the light intensity distribution of the laser beam through the attenuator, and it is easy to prepare the polymer-dispersed liquid crystal holographic gratings whose diffraction efficiency gradually increases along the waveguide propagation direction depending on the desired curve in a large scale.

The above-mentioned first set curve and the second set curve can be various curves, which can be determined depending on the change of the diffraction efficiency of the grating. For example, the first set curve and the second set curve can be both linear curves, and the diffraction efficiency of the obtained polymer-dispersed liquid crystal holographic grating can be evenly decreased or evenly increased in a certain direction.

Figure 1:
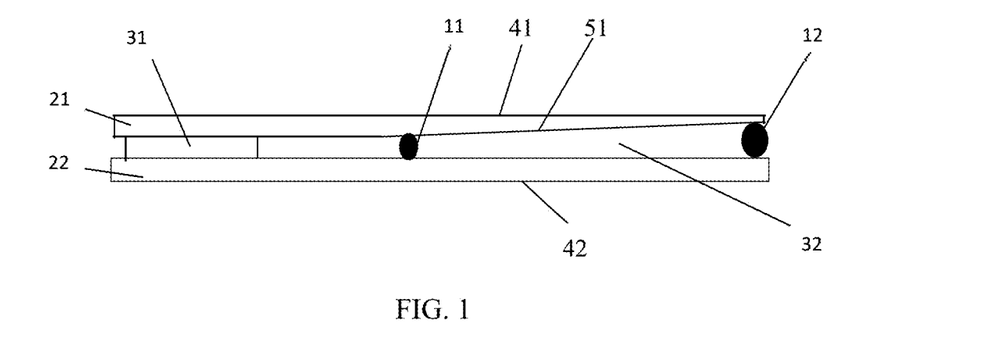
FIG. 1 is a schematic view of a grating in which diffraction efficiency is changed by adding a pad.

FIG. 1 is a schematic diagram of a grating in which the variation of diffraction efficiency can be achieved by adding a pad. As shown in FIG. 1, this scheme includes pads 11 and 12 having particles of very small size between a waveguide sheet 21 and a waveguide sheet 22, and controls the variation of thickness of the coupling output grating 32 by controlling the diameters of the pads 11 and 12 at both sides. At the same time, in order to level an upper plane 41 and a lower plane 42 of an integral waveguide, it needs to ensure that an inner surface 51 of an upper portion of the waveguide sheet 21 is inclined, and the inclined angle is determined by the particle size of the pads 11, 12.

In a holographic waveguide system, the coupling output grating needs to have property of increasing diffraction efficiency along the waveguide propagation direction, while the input grating needs high diffraction efficiency without changing the diffraction efficiency. Therefore, by changing the thickness of the coupling output grating 32 by adding pads, the thickness of partial coupling input grating 31 cannot be changed (as shown in FIG. 1). The grating layer in the waveguide is very thin, generally in the order of micrometer. The particle size of the added pad is generally within 10 μm. In order to control the parallelism of the upper and lower surfaces of the two waveguide sheets, the interior of the waveguide sheet 21 is designed to have a certain inclined angle. The inclined angle is determined by the diameter difference of the pads and the length of the coupling output grating region.

Figure 2:
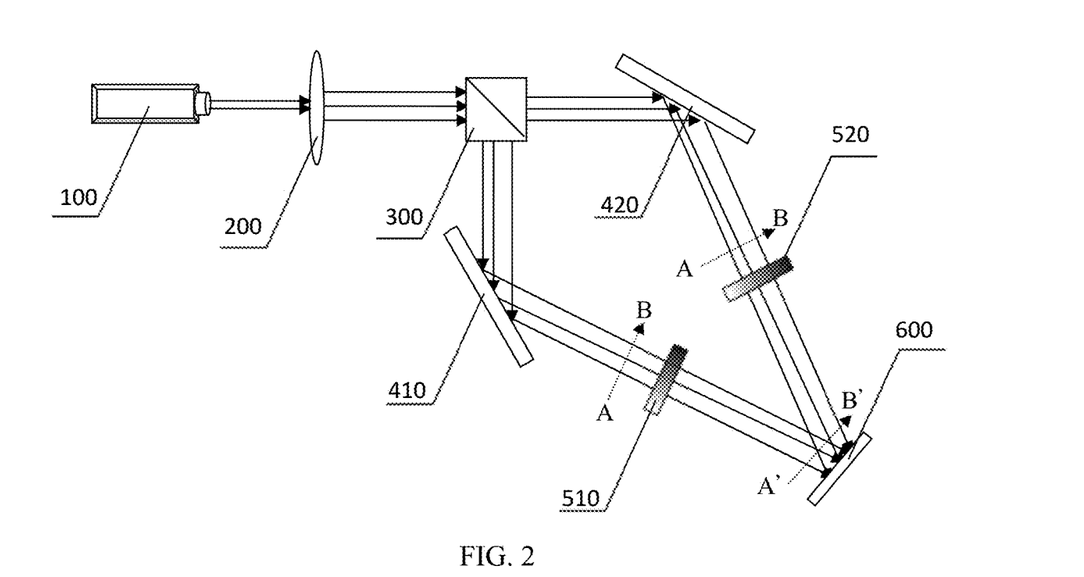
FIG. 2 is a schematic structural view of a system for preparing a polymer-dispersed liquid crystal holographic grating according to an embodiment of the present disclosure.

FIG. 2 is a schematic structural view of a system for preparing a polymer-dispersed liquid crystal holographic grating according to an embodiment of the present disclosure. As shown in FIG. 2, a system for preparing a polymer-dispersed liquid crystal holographic grating may include two attenuators, for example, an attenuator 510 and an attenuator 520.

The laser 100 is used to emit a laser beam, and the beam expander 200 is used to expand the laser beam. The beam splitter 300 is used to divide the expanded beam into a first split light beam and a second split light beam. The first reflector 410 may reflect the first split light beam to the liquid crystal box 600. The second reflector 420 may reflect the second split light beam to the liquid crystal box 600. The liquid crystal box 600 receives the first split light beam and the second split light beam, and the first split light beam and the second split light beam may interfere at the liquid crystal box 600 to form interference fringes. This interference fringes expose the polymer-dispersed liquid crystal in the liquid crystal box 600 to separate the polymer and the liquid crystal in the polymer-dispersed liquid crystal to form a polymer-dispersed liquid crystal holographic grating.

Wherein one of the attenuators 510 can be arranged on the optical path between the first reflector 410 and the liquid crystal box 600 for modulating, for example, the first split light beam mentioned above. Another attenuator 520 can be arranged on the optical path between the second reflector 420 and the liquid crystal box 600 for modulating, for example, the second split light beam mentioned above.

The laser intensity of the first split light beam passing through the attenuator 510 is gradually attenuated along the first set curve A→B, and the laser intensity of the second split light beam passing through the attenuator 520 is gradually attenuated along the first set curve A→B. The attenuated first split light beam and the attenuated second split light beam converge at the liquid crystal box 600 and interfere with each other to form interference fringes in which the light intensity gradually decreases along the second set curve A→B. This interference fringe exposes the polymer-dispersed liquid crystal in the liquid crystal box 600 to a polymer-dispersed liquid crystal grating in which the diffraction efficiency decreases along the second set curve A'→B'.

The first set curve A→B along which the laser is attenuated is generally consistent with the attenuating direction of the light intensity of the attenuator. In this embodiment, the attenuator is placed in the same direction, so the direction in which the laser beam of the first split light beam and the second split light beam are attenuated is the changing direction of the first set curve A→B. Since the first split light beam and the second split light beam are reflected by the first reflector and the second reflector, respectively, the light intensity of the first split light beam and the light intensity of the second split light beam incident on the liquid crystal box 600 are in the same direction (the changing direction of the second set curve) changes, i.e., the light intensity distribution is uniform, so that the first split light beam and the second split light beam can form light intensity gradually changing interference fringes along the second set curve A'→B', such as decreasing interference fringes. The interference fringe exposes the polymer-dispersed liquid crystal within the liquid crystal box 600, causing it to form a gradually changing diffractive efficiency of polymer-dispersed liquid crystal grating along the second set curve A'→B', such as decreasing diffractive efficiency. The second set curve A'→B' may substantially correspond to the first set curve A→B, in other words, the first set curve A→B may determine the second set curve A'→B'.

Figure 3:
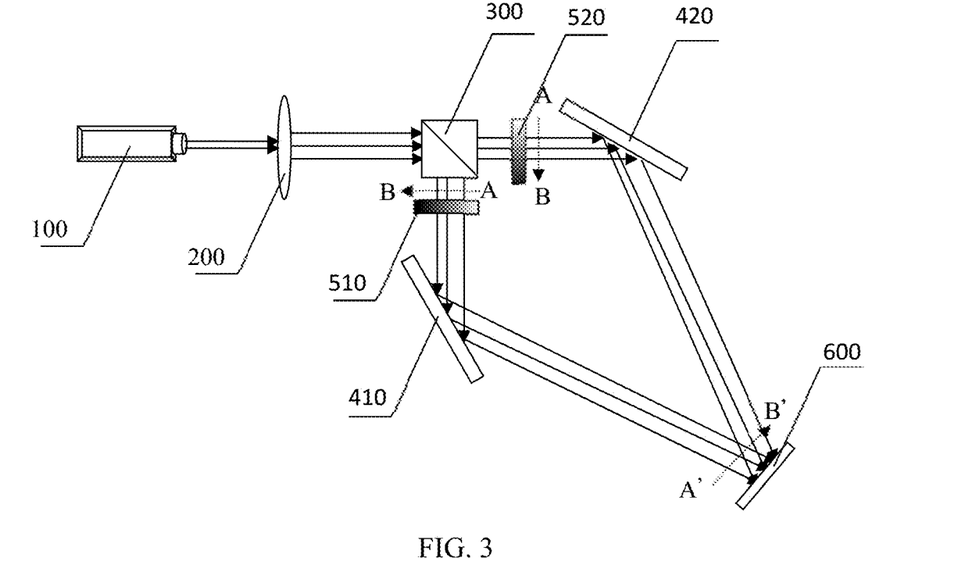
FIG. 3 is a schematic structural view of a system for preparing a polymer-dispersed liquid crystal holographic grating according to another embodiment of the present disclosure.

FIG. 3 is a schematic structural view of a system for preparing a polymer-dispersed liquid crystal holographic grating according to another embodiment of the present disclosure. As shown in FIG. 3, a system for preparing a polymer-dispersed liquid crystal holographic grating according to an embodiment of the present disclosure may include two attenuators, for example, an attenuator 510 and an attenuator 520. The difference between the preparation system of the polymer-dispersed liquid crystal holographic grating of this embodiment and the preparation system of the polymer-dispersed liquid crystal holographic grating of FIG. 2 lies mainly in that the positions of the optical paths where the attenuator 510 and the attenuator 520 are located are different. Specifically, one attenuators 510 is not arranged on the optical path between the first reflector 410 and the liquid crystal box 600, but is arranged on the optical path between the beam splitter prism 300 and the first reflector 410 to attenuate the above first split light beam. The other attenuator 520 is not arranged on the optical path between the second reflector 420 and the liquid crystal box 600, but is arranged on the optical path between the beam splitter prism 300 and the second reflector 420 to attenuate the above second split light beam.

The first split light beam modulated by the attenuator 510 is reflected by the first reflector 410 to reach the liquid crystal box 600, and the second split light beam modulated by the attenuator 520 is reflected by the second reflector 420 to reach the liquid crystal box 600. The two light beams converge at the liquid crystal box 600. An interference beam whose light intensity decreases along the second set curve can also be formed.

In the present embodiment, since the attenuators 510, 520 are arranged in front of the reflectors (the first reflectors 410, 4 and the second reflectors 20), if the decreasing direction of diffraction efficiency of the polymer-dispersed liquid crystal holographic gratings to be prepared is still along the second set curve A'→B', as shown in FIG. 2 and FIG. 3, the attenuating directions of the attenuators 510, 520 in FIG. 3 are adjusted relative to the attenuating directions of the attenuators 510, 520 in FIG. 2, for example, the attenuating direction is placed in the opposite direction.

The attenuating directions of the attenuators 510, 520 in the embodiments of the present disclosure can be set as needed as long as the two light beams passing through the attenuator 510 and the attenuator 520 are uniformly distributed at the liquid crystal box 600, for example, both decrease along the curve changing direction of the second set curve A'→B', or both decrease along the opposite direction of the curve changing direction of the second set curve A'→B'.

Figure 4:
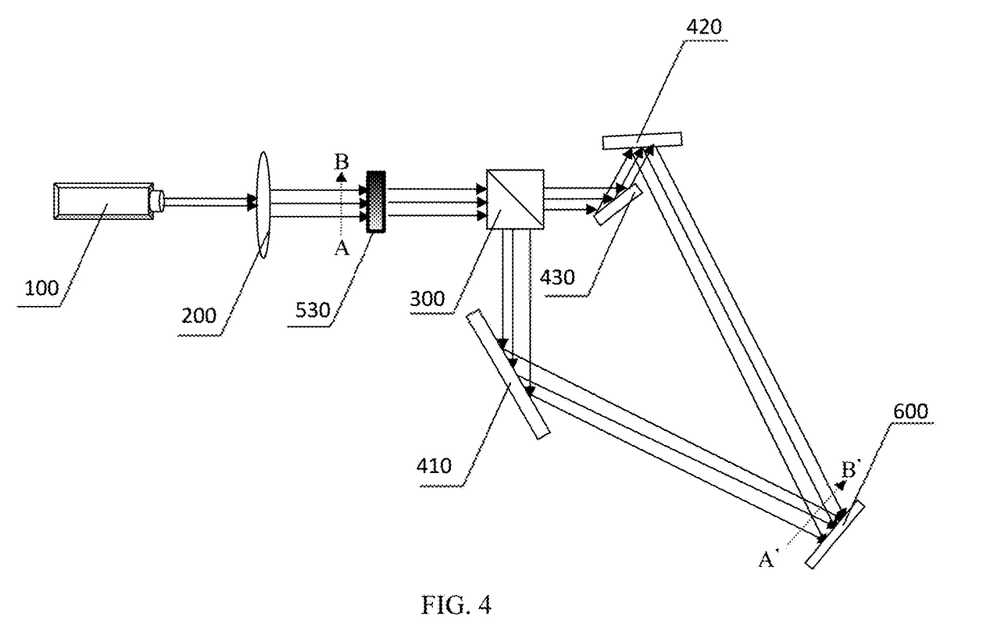
FIG. 4 is a schematic structural view of a system for preparing a polymer-dispersed liquid crystal holographic grating according to another embodiment of the present disclosure.

FIG. 4 is a schematic structural view of a system for preparing a polymer-dispersed liquid crystal holographic grating according to another embodiment of the present disclosure. As shown in FIG. 4, a system for preparing a polymer-dispersed liquid crystal holographic grating according to an embodiment of the present disclosure may include only one attenuator 530. The attenuator 530 can be arranged on the optical path between the beam expander 200 and the beam splitter prism 300 for attenuating the expanded laser beam. As shown in FIG. 4, the system for preparing the polymer-dispersed liquid crystal holographic grating further includes a third reflector 430. The third reflector 430 is arranged between the beam splitter prism 300 and the second reflector 420 and is configured to reflect the second split light beam emitted from the beam splitter prism 300 to the second reflector 420. The first split light beam and the second split light beam travel from the beam splitter prism 300 to the liquid crystal box 600 at the same optical path length.

The expanded laser beam can be gradually attenuated along the first set curve A→B, and the attenuated laser beam is divided by the beam splitter prism 300 into the attenuated first split light beam and the attenuated second split light beam. According to the spectral theory of the beam splitter prism 300, the attenuating directions of the light intensity of the two beams split by the beam splitter prism 300 in the laser beam attenuated in the same direction are different. If the attenuated second split light beam does not pass through the third reflector 430 and is directly reflected by the second reflector 420 to the liquid crystal box 600, the decreasing direction of the light intensity of the second split light beam reaching the liquid crystal box 600 and the decreasing direction of the light intensity of the first split light beam reflected to the liquid crystal box 600 via the first reflector 410 are opposite. For example, the decreasing direction of the light intensity of the second split light beam is the curve changing direction of the second set curve A'→B', and the decreasing direction of the light intensity of the first split light beam is the opposite direction B'→A' of the curve changing direction of the second set curve A'→B'. Therefore, in the present embodiment, the third reflector 430 can adjust the attenuating direction and the decreasing light intensity of the second split light beam to be consistent with the attenuating direction of the first split light beam. In addition, the positions of the respective reflector (the first reflector 410, the second reflector 420, and the third reflector 430) can be appropriately adjusted so that the optical path length of the first split light beam and the second split light beam are the same from the beam splitter prism 300 to the liquid crystal box 600 so that the first split light beam and the second split light beam interfere with each other at the liquid crystal box 600.

In another embodiment, the third reflector 430 can be arranged between the beam splitter prism 300 and the first reflector 410 to reflect the first split light beam emitted from the beam splitter prism 300 to the first reflector 410. At this time, the interference fringes are formed on the liquid crystal box, in which the light intensity gradually thereof decreases in the opposite direction from the curve changing direction of the second set curve A'→B'.

In yet another embodiment, the attenuating directions of the attenuator 510 and the attenuator 520 can be exchanged simultaneously, the light intensity decreasing direction of the interference beam at the liquid crystal box 600, thereby changing the decreasing direction of diffraction efficiency of the polymer-dispersed liquid crystal grating.

In one embodiment, the above polymer-dispersed liquid crystal may include photoinitiators, co-initiators, crosslinking agent, surface-active agent, polymers, and nematic liquid crystals mixed in mass percentages of 1%:0.5%:11%:6%:45%:36.5%, respectively. In this embodiment, raw materials such as photoinitiators, co-initiators, crosslinking agent, surface-active agent, polymers, and nematic liquid crystals, etc. are mixed in mass percentages: 1%:0.5%:11%:6%:45%:36.5% and injected into two pieces of transparent conductive glass to obtain a liquid crystal box. The liquid crystal box of the embodiment of the present disclosure can be an existing liquid crystal box, and the shape of the liquid crystal box does not need to change, so that the preparation difficulty of the liquid crystal box can be reduced.

The polymer-dispersed liquid crystal in the liquid crystal box is arranged in a laser interference optical field with an attenuator to expose to achieve the two-phase separation of the liquid crystal and the polymer in the polymer-dispersed liquid crystal. And the two phases of the liquid crystal and the polymer being separated to different degrees can lead to different diffraction efficiencies of polymer-dispersed liquid crystal gratings.

In one embodiment, the above laser can be a laser of various wavelengths.

In one embodiment, the system for preparing a polymer-dispersed liquid crystal holographic grating may further include at least one stepping motor, which can be used to move the attenuator into or out of the optical path between the beam expander and the liquid crystal box. Each attenuator can be moved by its own stepping motor. For example, as shown in FIGS. 2 and 3, two attenuators 510 and 530 can be mounted on two stepping motors, respectively, and driving two stepping motors may move the attenuators 510, 530 into or out of the optical path. When exposure is needed to prepare a coupling input grating, the diffraction efficiency of the grating does not need to change, and the stepping motor can be used to move the attenuator out of the optical path, so that the diffraction efficiency of the polymer-dispersed liquid crystal holographic grating is uniform. When exposure is needed to prepare a coupling output grating, the diffraction efficiency of the grating needs to be increased uniformly along the waveguide propagation direction. At this time, a stepping motor can be used to move the attenuator into the optical path, so that the diffraction efficiency of the polymer-dispersed liquid crystal holographic grating can be decreased along the second set curve. The changing direction of the curve of the second set curve can be an opposite direction of the waveguide propagation direction, and specifically, which can be achieved by adjusting the placement direction of the liquid crystal box exposure or when using, so that the grating diffraction efficiency can be increased uniformly along the waveguide propagation direction.

In this embodiment, the stepping motor moves the attenuator into or out of the optical path between the beam expander and the liquid crystal box, so that the system of the present disclosure can satisfy the preparation of different polymer-dispersed liquid crystal holographic gratings and has a wide range of application.

In one embodiment, the transparency of the above attenuator can be gradually decreased along the above first set curve. By setting the attenuator with the transparency gradually decreasing along the first set curve, the laser beam passing through the attenuator can be modulated along the first set curve, so that the light intensity of the laser beam of the first set curve is gradually reduced.

Figure 5:
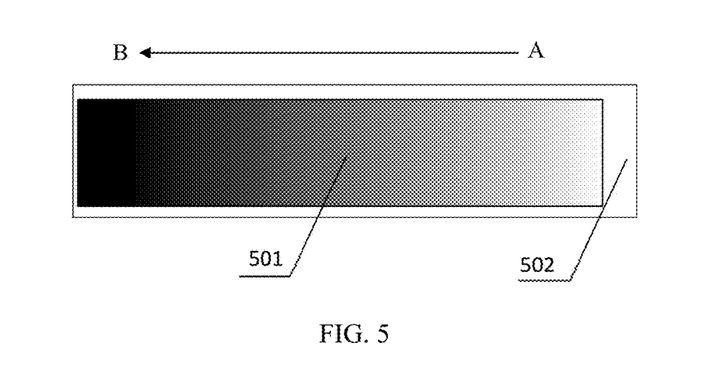
FIG. 5 is a schematic structural view of an attenuator according to an embodiment of the present disclosure.

FIG. 5 is a schematic structural view of an attenuator according to an embodiment of the present disclosure. As shown in FIG. 5, the attenuator (510, 520, and 530) can be a transparent substrate 502, such as quartz glass, on the surface of which a metal coating film 501 with a gradually increasing thickness along a first set curve is deposited. The metal coating film 501 can be a coating film of one or more metals, such as a metal coating film of Fe, Ti, Ni, or the like. In this embodiment, the attenuation of the laser beam by the attenuator can be adjusted by changing the thickness of the metal film on the attenuator, such as degree of attenuation, direction of attenuation, and the like. One or more coating films, such as metal film layers, can be deposited on the transparent substrate 502 by sputtering or thermal evaporation. The amount of attenuation of the laser light passing through the attenuator can be determined by the thickness of the metal film.

The attenuator in various embodiments of the present disclosure covers various visible light attenuators that can modulate the laser beam in a particular direction to make it change according to a set curve.

Figure 6:
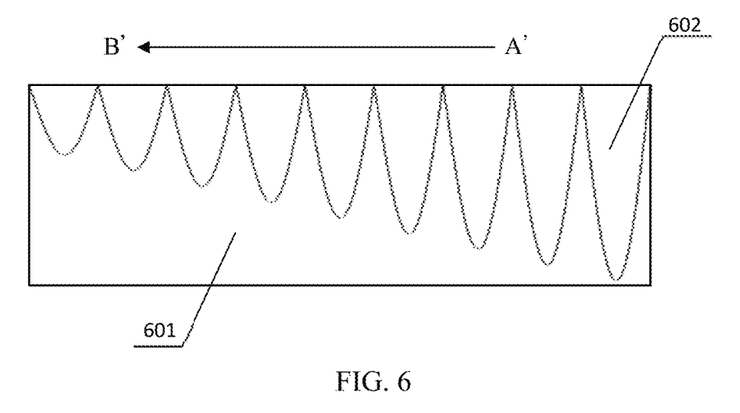
FIG. 6 is a schematic sectional view of a polymer-dispersed liquid crystal holographic grating prepared according to a method of an embodiment of the present disclosure.

FIG. 6 is a schematic cross-sectional view of a polymer-dispersed liquid crystal holographic grating prepared by a system according to an embodiment of the present disclosure. The two bundles of laser beams attenuated by the attenuator shown in FIG. 5 form interference light whose light intensity decreases along the second set curve A'→B' at the liquid crystal box 600, and the polymer-dispersed liquid crystal in the liquid crystal box 600 is exposed by the interference light. As shown in FIG. 6, the degree of separation of the polymer 601 and the liquid crystal 602 can be gradually decreased along a second set curve A'→B'. The polymer 601 may represent a polymer-rich region, and the liquid crystal 602 may represent a liquid-crystal-rich region 602.

Figure 7:
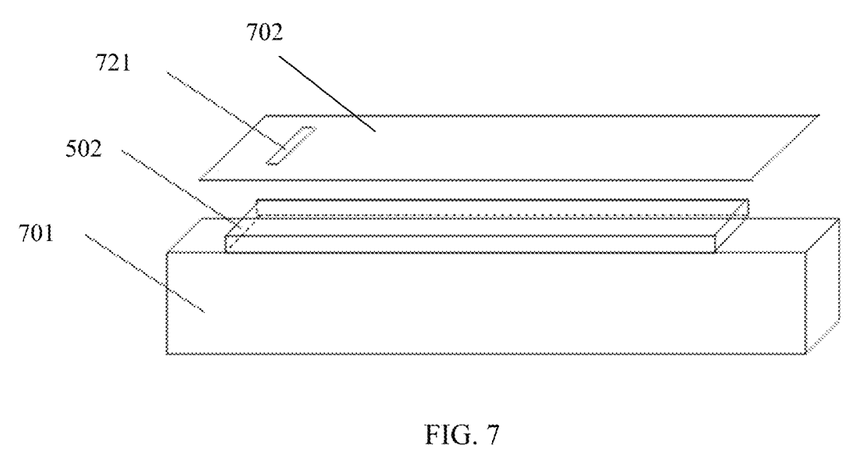
FIG. 7 is a schematic structural view of an attenuator preparation apparatus according to an embodiment of the present disclosure.

FIG. 7 is a schematic structural view of an attenuator preparation apparatus according to an embodiment of the present disclosure. As shown in FIG. 7, a system for preparing a polymer-dispersed liquid crystal holographic grating according to an embodiment of the present disclosure may further include an attenuator preparation apparatus. The attenuator preparation apparatus may include a stepping motor 701 and a mask plate 702. The stepping motor 701 is used to move the substrate 502 for driving the attenuator along the first set curve. The mask plate 702 is provided with a deposition hole 721 for depositing a corresponding coating pattern on the substrate 502. According to the predetermined light transmittance curve equation of the attenuator, the time for the deposition hole 721 staying at each position above the substrate 502 can be determined, thereby determining the coating time for each region on the substrate 502, and the stepping motor 701 can drive the substrate 721 to move. The deposition holes 721 are located at various positions above the substrate 502.

In the above embodiments, the first set curve A B and the second set curve A'→B' shown in FIG. 2 to FIG. 7 only schematically illustrate the changing direction of the curve by an arrow line, and does not intend to limit the first set curve A B and the second set A'→B' to a linear variation curve. In other embodiments, the first set curve A B and the second set curve A'→B' can be curves of other changes, such as hyperbola.

Based on the same concept as the system for preparing a polymer-dispersed liquid crystal holographic grating as shown in FIG. 1, the present disclosure also provides a method for preparing a polymer-dispersed liquid crystal holographic grating. The embodiment of the preparation method of the polymer-dispersed liquid crystal holographic grating and the embodiment of the preparation system of the polymer-dispersed liquid crystal holographic grating can be cross-referenced to each other, and the repeated description is omitted.

Figure 8:
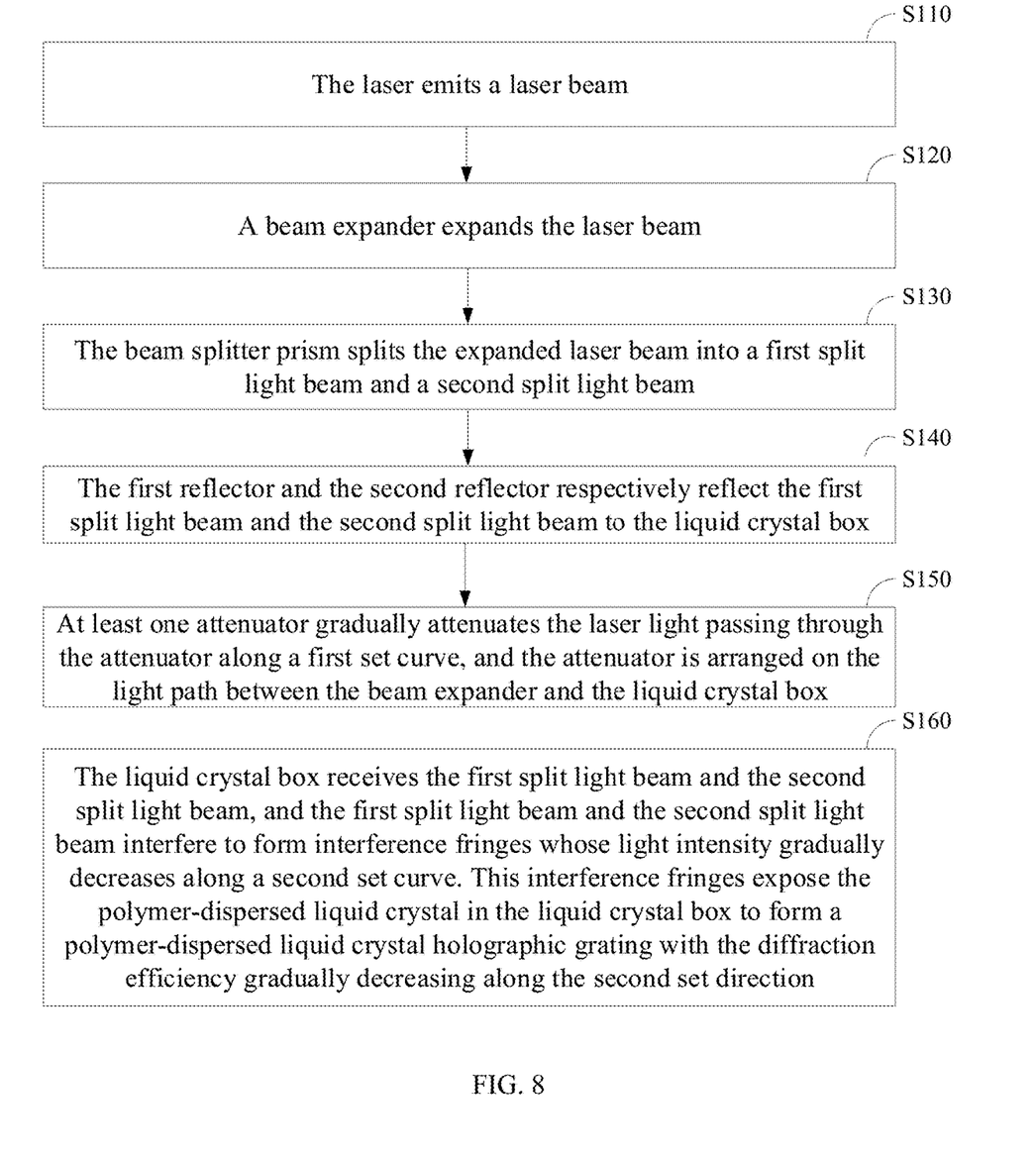
FIG. 8 is a schematic flow chart of a method for preparing a polymer-dispersed liquid crystal holographic grating according to an embodiment of the present disclosure.

FIG. 8 is a schematic flow chart of a method for preparing a polymer-dispersed liquid crystal holographic grating according to an embodiment of the present disclosure. As shown in FIG. 8, a method for preparing a polymer-dispersed liquid crystal holographic grating according to an embodiment of the present disclosure may include:

S110: The laser emits a laser beam;
S120: A beam expander expands the laser beam;
S130: The beam splitter prism splits the expanded laser beam into a first split light beam and a second split light beam;
S140: The first reflector and the second reflector respectively reflect the first split light beam and the second split light beam to the liquid crystal box;
S150: At least one attenuator gradually attenuates the laser light passing through the attenuator along a first set curve, and the attenuator is arranged on the optical path between the beam expander and the liquid crystal box;
S160: The liquid crystal box receives the first split light beam and the second split light beam, and the first split light beam and the second split light beam interfere to form interference fringes whose light intensities gradually decrease along a second set curve. The polymer-dispersed liquid crystal in the liquid crystal box is exposed to form a polymer-dispersed liquid crystal holographic grating with a decreasing diffraction efficiency along the second set curve.

In the above process S150, the number of attenuators can be selected as needed. The attenuator can be arranged at a plurality of different positions on the optical path between the beam expander and the liquid crystal box as long as the same light intensity distribution can be obtained after the two laser beams of the first split light beam and the second split light beam are collected in the liquid crystal box, and the interference fringes whose light intensity gradually changes in the same direction according to the set curve can be generated at the liquid crystal box depending on the needs. For example, the attenuator can be arranged on the optical path between the beam expander and the beam splitter prism, or the attenuator can be arranged on the beam path from the beam splitter prism to the reflector (the first reflector and the second reflector), or the attenuator can be arranged on the optical path from the reflector (first reflector and second reflector) to the liquid crystal box.

In the above process S160, the above first set curve can be determined according to the attenuating direction of the light intensity of the attenuator. The second set curve corresponds to the decreasing direction of the light intensity of the interference light beam and the diffraction efficiency of the prepared grating, and corresponds to the above first set curve.

In one embodiment, the above attenuator can be moved into or out of the optical path by a stepping motor to prepare gratings with uniform diffraction efficiency or reduced diffraction efficiency in the same direction or decreased by a set curve, which can be used as coupling input gratings and coupling output gratings respectively.

Figure 9:
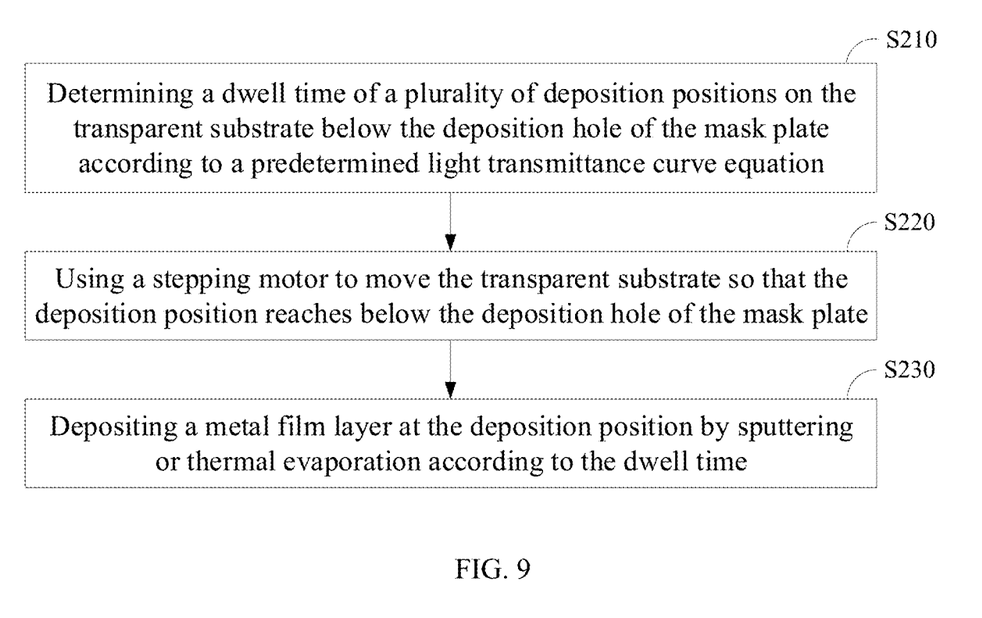
FIG. 9 is a schematic flow chart of a method for preparing an attenuator according to an embodiment of the present disclosure.

FIG. 9 is a schematic flow chart of a method for preparing an attenuator according to an embodiment of the present disclosure. As shown in FIG. 9, a method for preparing an attenuator may include:

S210: Determining a dwell time of a plurality of deposition positions on the transparent substrate below the deposition hole of the mask plate according to a predetermined light transmittance curve equation.

S220: Using a stepping motor to move the transparent substrate so that the deposition position reaches below the deposition hole of the mask plate.

S230: Depositing a metal film layer at the deposition position by sputtering or thermal evaporation according to the dwell time.

In another embodiment, before S220, an antireflection film can be coated on both sides of the transparent substrate and the metal film layer is subsequently coated, so as to ensure that the attenuator attenuates 0 dB of the light passing through the transparent substrate.

The attenuator can be prepared by sputtering or thermally evaporating one or more layers of metal films on a transparent substrate such as a glass substrate, and the amount of attenuation of light by the attenuator is determined by the thickness of the metal film. In one embodiment, a titanium target can be selected to sputter-deposit a titanium metal film layer with smaller dispersion around 1550 nm as a light attenuation layer. The substrate can be a glass sheet, and the material may generally be quartz, which can be coated on both sides anti-reflective coating after being carefully cleaned to ensure 0 dB attenuation. The metal coating time in each region can be determined according to the expected transmittance curve equation, the glass substrate can be driven by a stepping motor.

The embodiments of the present disclosure provides a system and a method for preparing the polymer-dispersed liquid crystal holographic grating which controls the separation degree of the polymer and the liquid crystal by controlling the light intensity of the exposure light beam by the attenuator, and can prepare a polymer-dispersed liquid crystal holographic gratings whose diffraction efficiency can be increased along the waveguide propagation direction. The present disclosure does not need to change the shape of the liquid crystal box, and the attenuator is easy to prepare, so the large-scale preparation of polymer-dispersed liquid crystal holographic gratings whose diffraction efficiency gradually changes according to a set curve can be realized. In the present disclosure, the change of the diffraction efficiency of the grating can be controlled by adjusting the light intensity of the exposure light, instead of controlling the change of the diffraction efficiency of the grating by adjusting the exposure time, so the problem of complicated control and increased grating preparation period can be avoided.

In the description of the present specification, reference is made to the descriptive meanings of the terms "one embodiment", "one specific embodiment", "some embodiments", "for example", "an example", "a specific example", or "some examples" and the like which is intended that the specific features, structures, materials, or characteristics described in conjunction with the embodiments or examples be included in at least one embodiment or example of the present disclosure. In this specification, the schematic representation of the above terms does not necessarily refer to the same embodiments or examples. Moreover, the particular features, structures, materials, or characteristics described can be combined in any suitable manner in one or more embodiments or examples. The sequence of steps involved in each embodiment is used to schematically illustrate the implementation of the present disclosure. The sequence of the steps is not limited, which can be adjusted as needed.

The specific embodiments described above further describe the purpose, technical solutions and beneficial effects of the present disclosure in detail. It should be understood that the above description is only examples of the present disclosure and is not used to limit the protection scope of the present disclosure, and any modifications, equivalent substitutions, improvements etc. made within the spirit and principle of the present disclosure shall be included in the scope of the present disclosure.

What is claimed is:

1. A system for preparing a polymer-dispersed liquid crystal holographic grating comprising:
   a laser configured to emit a laser beam;
   a beam expander configured to expand the laser beam to obtain an expanded laser beam;
   a beam splitter prism configured to split the expanded laser beam into a first split light beam and a second split light beam;
   a liquid crystal box containing polymer-dispersed liquid crystal;
   a first reflector configured to reflect the first split light beam to the liquid crystal box;
   a second reflector configured to reflect the second split light beam to the liquid crystal box; and
   an attenuator arranged on an optical path between the beam expander and the liquid crystal box, the attenuator being configured to gradually attenuate at least one of the laser beam, the expanded laser beam, the first split light beam, or the second split light beam along a first set curve, the first set curve being determined according to an attenuating direction of light intensity of the attenuator;

wherein the first split light beam and the second split light beam form interference fringes having light intensities gradually decreasing along a second set curve at the liquid crystal box to expose the polymer-dispersed liquid crystal to achieve two-phase separation of liquid crystal and polymer in the polymer-dispersed liquid crystal in which a separation degree of the polymer and the liquid crystal gradually changes along the second set curve, so as to form the polymer-dispersed liquid crystal holographic grating having a diffraction efficiency decreasing along the second set curve, the second set curve corresponds to a decreasing direction of light intensity of an interference light beam and the diffraction efficiency of the polymer-dispersed liquid crystal holographic grating, and corresponds to the first set curve.

2. The system according to claim 1,
wherein the attenuator is a first attenuator arranged on an optical path between the first reflector and the liquid crystal box, and configured to attenuate the first split light beam;
the system further comprising:
a second attenuator arranged on an optical path between the second reflector and the liquid crystal box, and configured to attenuate the second split light beam.

3. The system according to claim 1,
wherein the attenuator is a first attenuator arranged on an optical path between the beam splitter prism and the first reflector, and configured to attenuate the first split light beam;
the system further comprising:
a second attenuator arranged on an optical path between the beam splitter prism and the second reflector, and configured to attenuate the second split light beam.

4. The system according to claim 1, further comprising:
a third reflector arranged between the beam splitter prism and the second reflector, and configured to reflect the second split light beam emitted from the beam splitter prism to the second reflector;
wherein:
the first split light beam and the second split light beam have a same optical path length from the beam splitter prism to the liquid crystal box; and
the attenuator is arranged on an optical path between the beam expander and the beam splitter prism, and configured to attenuate the expanded laser beam.

5. The system according to claim 1, wherein the polymer-dispersed liquid crystal comprises photoinitiators, co-initiators, crosslinking agent, surface-active agent, polymers, and nematic liquid crystals mixed in mass percentages of 1%, 0.5%, 11%, 6%, 45%, and 36.5%, respectively.

6. The system according to claim 1, further comprising:
a stepping motor configured to move the attenuator into or out of the optical path between the beam expander and the liquid crystal box.

7. The system according to claim 1, wherein a transparency of the attenuator gradually decreases along the first set curve.

8. The system according to claim 7, wherein the attenuator includes:
a transparent substrate; and
a metal coating film on a surface of the transparent substrate, a thickness of the metal coating film gradually increasing along the first set curve.

9. A method for preparing a polymer-dispersed liquid crystal holographic grating comprising:
emitting, by a laser, a laser beam;
expanding, by a beam expander, the laser beam to obtain an expanded laser beam;
splitting, by a beam splitter, the expanded laser beam into a first split light beam and a second split light beam;
reflecting, by a first reflector and a second reflector, the first split light beam and the second split light beam to a liquid crystal box, respectively;
gradually attenuating, by an attenuator arranged on an optical path between the beam expander and the liquid crystal box, at least one of the laser beam, the expanded laser beam, the first split light beam, or the second split light beam along a first set curve, the first set curve being determined according to an attenuating direction of light intensity of the attenuator; and
forming the polymer-dispersed liquid crystal holographic grating with a diffraction efficiency gradually decreasing along a second set curve by interference fringes formed by interference between the first split light beam and the second split light beam at the liquid crystal box, the interference fringes having light intensities gradually decreasing along the second set curve;
wherein the interference fringes are configured to expose the polymer-dispersed liquid crystal to achieve two-phase separation of liquid crystal and polymer in the polymer-dispersed liquid crystal in which a separation degree of the polymer and the liquid crystal gradually changes along the second set curve, the second set curve corresponds to a decreasing direction of light intensity of an interference light beam and the diffraction efficiency of the polymer-dispersed liquid crystal holographic grating, and corresponds to the first set curve.

* * * * *